United States Patent
Patoux et al.

(10) Patent No.: US 9,537,138 B2
(45) Date of Patent: Jan. 3, 2017

(54) METHOD FOR PREPARING A MIXTURE OF AN ELECTRODE ACTIVE COMPOUND POWDER AND AN ELECTRONIC CONDUCTOR COMPOUND POWDER, RESULTING MIXTURE, ELECTRODE, CELL AND BATTERY

(75) Inventors: Sébastien Patoux, Fontaine (FR); Carole Bourbon, Saint-Michel de Saint-Geoirs (FR); Lise Daniel, Montmelian (FR)

(73) Assignee: Commissariat à l'énergie atomique et aux energies alternatives, Paris (FR)

( * ) Notice: Subject to any disclaimer, the term of this patent is extended or adjusted under 35 U.S.C. 154(b) by 1209 days.

(21) Appl. No.: 13/148,934

(22) PCT Filed: Feb. 9, 2010

(86) PCT No.: PCT/EP2010/051571
§ 371 (c)(1),
(2), (4) Date: Feb. 13, 2012

(87) PCT Pub. No.: WO2010/092044
PCT Pub. Date: Aug. 19, 2010

(65) Prior Publication Data
US 2012/0135291 A1    May 31, 2012

(30) Foreign Application Priority Data
Feb. 11, 2009 (FR) ...................................... 09 50858

(51) Int. Cl.
*H01M 4/13* (2010.01)
*B01F 3/12* (2006.01)
(Continued)

(52) U.S. Cl.
CPC .............. *H01M 4/13* (2013.01); *B01F 3/1242* (2013.01); *B01F 11/02* (2013.01); *H01M 4/139* (2013.01);
(Continued)

(58) Field of Classification Search
CPC ............. H01M 4/00–4/98; B01F 3/00–3/2292; B01F 11/00–11/04
See application file for complete search history.

(56) References Cited

U.S. PATENT DOCUMENTS 5,788,943 A * 8/1998 Aladjov ................... 423/594.19
6,447,950 B1 * 9/2002 Iijima ........................... 429/209
(Continued)

FOREIGN PATENT DOCUMENTS

| EP | 1547973 | 6/2005 |
|---|---|---|
| EP | 2034541 | 3/2009 |

(Continued)

OTHER PUBLICATIONS

International Search Report dated Apr. 26, 2010 for PCT Application No. PCT/EP2010/051571.
(Continued)

*Primary Examiner* — Alix Eggerding
(74) *Attorney, Agent, or Firm* — Knobbe, Martens, Olson & Bear, LLP

(57) ABSTRACT

A method for preparing a mixture of a powder of an electrode active compound and of a powder of an electron conducting compound is disclosed. According to some aspects, the method includes preparing a liquid medium containing the powder of the electrode active compound and the powder of the electron conducting compound, subjecting the liquid medium containing the powder of the electrode active compound and the powder of the electron conducting compound to the action of high energy ultrasonic waves,
(Continued)

removing the liquid medium, and collecting the mixture of the powder of the electrode active compound and of the powder of the electron conducting compound. According to some aspects, an electrode including the mixture as an electrochemically active material, a cell including the electrode, and an accumulator or battery including one or more of these cells are disclosed.

28 Claims, 5 Drawing Sheets

(51) Int. Cl.
*B01F 11/02* (2006.01)
*H01M 4/139* (2010.01)
*H01M 4/62* (2006.01)
*H01M 10/052* (2010.01)
*H01M 2/02* (2006.01)
*H01M 4/131* (2010.01)
*H01M 4/133* (2010.01)
*H01M 4/134* (2010.01)
*H01M 4/136* (2010.01)
*H01M 4/1391* (2010.01)
*H01M 4/1393* (2010.01)
*H01M 4/1395* (2010.01)
*H01M 4/1397* (2010.01)
*H01M 4/485* (2010.01)
*H01M 4/505* (2010.01)
*H01M 4/525* (2010.01)
*H01M 4/58* (2010.01)
*H01M 4/64* (2006.01)
*H01M 10/0525* (2010.01)

(52) U.S. Cl.
CPC .......... *H01M 4/624* (2013.01); *H01M 10/052* (2013.01); *H01M 2/0222* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1393* (2013.01); *H01M 4/1395* (2013.01); *H01M 4/1397* (2013.01); *H01M 4/485* (2013.01); *H01M 4/505* (2013.01); *H01M 4/525* (2013.01); *H01M 4/5825* (2013.01); *H01M 4/625* (2013.01); *H01M 4/64* (2013.01); *H01M 10/0525* (2013.01); *Y02E 60/122* (2013.01)

(56) References Cited

U.S. PATENT DOCUMENTS

| | | |
|---|---|---|
| 7,457,018 B2 | 11/2008 | Armand et al. |
| 7,776,234 B2 | 8/2010 | Gauthier et al. |
| 2003/0054250 A1* | 3/2003 | Kweon ............... H01M 4/131 429/231.1 |
| 2005/0042514 A1* | 2/2005 | Sun et al. ............... 429/231.95 |
| 2008/0171265 A1 | 7/2008 | Iriyama et al. |
| 2009/0023065 A1 | 1/2009 | Hwang et al. |
| 2010/0209778 A1 | 8/2010 | Jouanneau-Si Larbi et al. |

FOREIGN PATENT DOCUMENTS

| | | |
|---|---|---|
| WO | WO 02/27823 A1 | 4/2002 |
| WO | WO 2005/076390 A2 | 8/2005 |
| WO | WO 2009-004182 | 1/2009 |

OTHER PUBLICATIONS

The French Search Report for related application FR 09 50858, dated Jul. 3, 2009, in 1 page.
Barker, J., Saidi, M.Y., Swoyer, J.L., *A Carbothermal Reduction Method for the Preparation of Electroactive Materials for Lithium Ion Applications*, Journal of the Electrochemical Society, 150, A684-A688 (2003).

* cited by examiner

METHOD FOR PREPARING A MIXTURE OF AN ELECTRODE ACTIVE COMPOUND POWDER AND AN ELECTRONIC CONDUCTOR COMPOUND POWDER, RESULTING MIXTURE, ELECTRODE, CELL AND BATTERY

RELATED APPLICATIONS

This application is a U.S. National Phase of International Application No.: PCT/EP2010/051571, filed Feb. 9, 2010, which claims the benefit of French patent application Ser. No. 09 50858 filed Feb. 11, 2009, each of which is incorporated by reference in their entirety.

FIELD OF THE INVENTION

The invention relates to a method for preparing a mixture of a powder of an electrode active compound and of a powder of an electron conducting compound.

The invention further relates to the mixture obtainable by this method.

The invention also relates to a positive or negative electrode comprising this mixture as an electrochemically active material.

Finally the invention relates to a cell of a rechargeable accumulator (secondary battery) with a non-aqueous organic electrolyte, notably of a lithium battery and more specifically of a Li-ion battery comprising said electrode, as well as to the accumulator or battery comprising one or more of these cells.

The technical field of the invention may be generally defined as that of electrodes applied in electrochemical systems with a non-aqueous, organic electrolyte and more particularly as that of rechargeable accumulators (secondary batteries) with an organic electrolyte, such as lithium accumulators, batteries and more particularly Li-ion accumulators, batteries including at least two electrodes based on different active materials and an electrolyte in which the $Li^+$ cations have the possibility of migrating from one electrode to the other depending on the use during charging or discharging.

BACKGROUND

In order to meet increasing needs in the field of self-contained power supplies in fields as diverse as computers, video appliances, telephony, the space industry, the medical industry, microelectronics, stationary applications, hybrid vehicles . . . , several systems for storing energy are used today, including Li-ion, Ni-MH, Ni—Cd, and acid-lead accumulators.

These accumulators have different performances in terms of energy density and power density.

Whereas energy density corresponds to self-sufficiency of the storage system, power density indicates the capacity of the system of releasing a more or less significant amount of energy within a short time interval. This criterion is particularly important for new applications such as hybrid automobiles and power electronics.

Therefore Li-ion accumulators are increasingly used today as self-contained energy sources, in particular in portable equipment, where they progressively replace nickel-cadmium (Ni—Cd) and nickel-metal hydride (Ni-MH) accumulators.

For several years now, the sales of Li-ion accumulators widely have exceeded those of Ni-MH and Ni—Cd accumulators and they mainly relate to the fields of telephony and of portable computers for which self-sufficiency is a primordial criterion.

This development is explained by the continuous improvement in the performances of Li-ion accumulators in terms of energy density, thereby giving these accumulators mass and bulk energy densities much larger than those proposed by the Ni—Cd and Ni-MH technologies. Thus, the mass energy density is of more than 180 Wh/kg for Li-ion accumulators, versus 50 and 100 Wh/kg for Ni—Cd and Ni-MH accumulators respectively; while acid-lead accumulators with which automobiles are equipped, for example have an energy density of only 30 to 35 Wh/kg.

Like energy-intensive mobile applications requiring great self-sufficiency, power electronics now forms a field of application, with a future, for Li-ion accumulators capable of performing rapid charging/discharging cycles.

For this, the power performances of Li-ion accumulators may be strongly improved by the use of innovative materials of electrodes adapted to power applications.

In particular, $Li_4Ti_5O_{12}$ titanium oxide is an alternative to the negative graphite electrode for this type of application. Due to a higher potential than that of carbon (1.55V vs. $Li^+/Li$ against 0.1V vs. $Li^+/Li$ for graphite), this oxide with a spinel structure allows rapid recharging of the accumulator without the risk of formation of lithium dendrites and therefore of short circuits and explosion. Other titanium oxides are also under study. This for example concerns titanium dioxide $TiO_2$, with the anatase and bronze forms for example being favorable to insertion/extraction of the lithium.

Innovations are also in progress concerning the positive electrode. Various compounds may be used according to the desired voltage and capacity. Lithiated iron phosphate $LiFePO_4$, with an olivine structure (170 mAh/g to 3.4V vs. $Li^+/Li$), has been considered for several years as a positive electrode material of choice for certain new applications such as hybrid automobiles or portable cooling. At a less advanced stage, high voltage spinel oxides with great energy of the $LiNi_{0.5}Mn_{1.5}O_4$ type are also under study with view to future replacement of commercial lamellar oxides. The latter are still widely used in commercial Li-ion accumulators.

In every case, improvements in the power performances are reckoned with in order to meet the new needs.

Unlike the performances of accumulators in terms of energy density, which mainly depend on the selection of the electrochemical pair used, since the nature of the materials of the positive and negative electrodes imposes the voltage and the capacity of the cell, the performances in terms of power of Li-ion accumulators are strongly related to the method for preparing the electrode materials which influences their aspect, their size and their morphology.

Improvements are further required in this respect in order to durably implant Li-ion accumulators in high power applications.

In other words, the emergence of new generations of Li-ion accumulators requires the use of more performing electrode materials.

In particular, it is necessary to improve the specific capacity of the electrode materials at higher (charging/discharging) rates.

The solution which is presently used the most for meeting this need consists of adding to the electrode active compound, carbon or another chemical agent with which electron conductivity may be improved.

Thus, in documents WO-A1-02/27823 [1] and WO-A2-2005/076390 [2], it has been demonstrated that the electron conducting compound such as carbon may be directly incorporated into the electrode active compound during the synthesis of the latter which thus gives the possibility of having a mixture of electrode active material and of electron conducting compound such as carbon, homogeneous and of good electrochemical quality.

In these documents, the carbon is formed by thermal decomposition under a controlled, inert or reducing atmosphere, from an organic source such as saccharose, cellulose or citric acid.

This organic source is added beforehand to the precursors for the synthesis of the electrode active material. The formation of the electrode active compound, material, and the decomposition of the organic carbon source generally take place during the same heat treatment step. This heat treatment is generally carried out at a temperature comprised between 600 and 800° C.

It should be noted that for some electrode active materials sensitive to the effect of heat, such a temperature is too high. For example, $TiO_2$—B (bronze form), which is one of the structure varieties of $TiO_2$, is gradually transformed into $TiO_2$ of the anatase form from 500° C. and into $TiO_2$ of the rutile form above 800° C., while the $TiO_2$—B, as for it, is generally obtained between 300 and 400° C.

It is therefore not possible with such heat-sensitive electrode active materials to use the method for incorporating carbon described in the aforementioned documents [1] and [2].

Many other materials, the preparation of which takes place at a low temperature with a mild chemistry method, under hydrothermal conditions, have the same type of thermal limitation. Further, the presence of carbon, associated with a high synthesis temperature, notably above 500° C., entails the presence of a reducing atmosphere in the vicinity of the electrode active material.

This type of reaction set into play for preparing materials with the methods of documents [1] and [2] is therefore also incompatible with the synthesis of materials sensitive to reduction.

Further, a high temperature often has the consequence of increasing the size of the particles, caused by an agglomeration phenomenon, unfavorable to obtaining materials dedicated to high power applications.

In addition to the methods described in documents [1] and [2], in which the thermal decomposition of an organic source is carried out in situ simultaneously with the synthesis of the active material, a method in which carbon is used during the synthesis for reducing the degree of oxidation of the transition elements, is described in the document of J. Barker, M. Y. Saidi, J. L. Swoyer, *J. Electrochem. Soc.,* 150 (6) (2003) A684-A688 [3]. More specifically, this document describes a carbothermal reduction (CTR) process in which carbon with high specific surface area is intimately mixed with precursor compounds of the compounds $\gamma$-$LiV_2O_5$ and $Li_3V_2(PO_4)_3$ and the mixture is heated in an inert atmosphere. The method of this document substantially has the same drawbacks as the methods described in documents [1] and [2].

Therefore considering the foregoing, there exists a need for a method for preparing an electrochemically active electrode material, and notably an electrochemically active electrode material comprising a mixture of an electrode active compound and of an electron conducting compound which may be applied with any kinds of electrode active compounds and of electron conducting compounds and in particular even with electrode active compounds which are heat-sensitive and/or sensitive to reduction for example by carbon.

Further there exists a need for such a method which does not cause any structural modification of the active compound, or any degradation of the latter.

There still exists a need for such a preparation method which allows preparation of an electrochemically active electrode material which has improved electrochemical performances, in particular for high (charging/discharging) rates and high powers, notably as compared with similar electrochemically active materials presently used such as those prepared in documents [1], [2] and [3].

Finally there exists a need for such a method which is simple, reliable, easy to apply and which includes a limited number of steps.

The goal of the present invention is to provide a method for preparing a mixture of an electrode active compound and of an electron conducting compound which meets the whole of the needs listed above.

The goal of the present invention is still to provide such a method which does not have the drawbacks, limitations, defects and disadvantages of the methods of the prior art and which solves the problems of the methods of the prior art.

SUMMARY AND DESCRIPTION OF ASPECTS OF THE INVENTION

This goal and still other goals are achieved according to the invention by a method for preparing a mixture of a powder of an electrode active compound and of a powder of an electron conducting compound, in which the following successive steps are carried out:

- a liquid medium is prepared, containing the powder of the electrode active compound and the powder of the electron conducting compound;
- the liquid medium containing the powder of the electrode active compound and the powder of the electron conducting compound is subjected to the action of high energy ultrasonic waves;
- the liquid medium is removed;
- the mixture of the powder of an electrode active compound and of the powder of an electron conducting compound is collected.

Advantageously, the action of the ultrasonic waves is controlled, adjusted so that it allows a temperature of the liquid medium to be maintained below the boiling temperature of said liquid medium, and preferably a stable temperature.

Advantageously, the energy density produced by the ultrasonic waves may be from 50 to 1,000 W/L, preferably from 150 to 700 W/L, and still preferably from 300 to 500 W/L of the liquid medium.

Advantageously, the liquid medium may be subjected to the action of ultrasonic waves intermittently.

Thus the liquid may be subjected to the action of the ultrasonic waves for periods generally from 1 to 10 seconds while observing pauses with a duration of generally 1 to 10 seconds between two periods.

Advantageously, the liquid medium may be subjected to the action of ultrasonic waves for a total duration from 1 minute to 40 hours, preferably from 30 minutes to 30 hours, including the pauses.

Advantageously, the liquid medium may be selected from water; aqueous solutions; organic solvents, for example, ethanol, NMP (N-methylpyrrolidone), hexane, acetone; and mixtures thereof.

Advantageously, the mixture of the powder of the electrode active compound and of the powder of the electron conducting compound is insoluble in the liquid medium.

Advantageously, the electrode active compound is selected from positive electrode active compounds and negative electrode active compounds of Li-ion batteries, and the positive electrode active compounds of metal lithium batteries.

Advantageously, the electrode active compound is selected from titanium oxides such as $TiO_2$ in the bronze or anatase form, $Li_4Ti_5O_{12}$; compounds with a polyanion framework such as $LiFePO_4$, $LiMnPO_4$, and $Li_3V_2(PO_4)_3$; lamellar oxides such as $LiCoO_2$, and $LiNi_{0.8}Co_{0.15}Al_{0.05}O_2$; spinel oxides such as $LiMn_2O_4$, and $LiNi_{0.5}Mn_{1.5}O_4$; silicon; sulfur; carbon; graphite carbon; and mixtures thereof.

Advantageously, the electron conducting compound is selected from metal particles such as Ag, Cu, Ni particles; from carbon, for example as graphite, carbon black, carbon fibers, carbon nanowires, carbon nanotubes, carbon nanospheres; electron conducting polymers; and mixtures thereof.

When the electron conducting compound is a carbon or a mixture of carbons, it(they) may be advantageously selected from amorphous or crystallized carbons in the form of fibers, nanotubes, nanowires or nanospheres.

Advantageously, the electron conducting compound such as carbon accounts for 2 to 60% by mass of the mixture.

The method according to the invention has a series of specific steps, which has never been disclosed in the prior art.

In particular, the method according to the invention is fundamentally distinguished from the method of the prior art, in that it applies the action of high energy ultrasonic waves on a liquid medium such as water containing the powders of the two compounds already synthesized beforehand.

The method according to the invention uses as a starting material, the powders of each of the compounds, synthesized beforehand, and not like in the methods of the prior art, such as those of documents WO-A-02/27823 and WO-A-2005/076390, precursors of these compounds which are treated at a high temperature in order to form said compounds.

The method according to the invention does not use high temperatures for synthesizing the compounds and may therefore be applied with a great variety of compounds, even heat-sensitive compounds which was not possible with the methods of the prior art.

Surprisingly with the method according to invention, it is possible to obtain an intimate mixture of particles of both compounds without causing any structural modification, notably of the electrode active compound. No degradation of the electrode active compound and no change in morphology of this electrode active compound are observed. Also, no change in morphology of the electron conducting compound nor any degradation of this compound are observed.

It should be noted that although high temperatures may possibly occur during the action of the ultrasonic waves on the liquid medium, these temperatures are highly localized and cannot cause degradation of the compounds, even of the thermally sensitive compounds.

The overall temperature of the liquid medium, as for it, remains moderate, less than its boiling temperature and in every case much lower than the temperature required for decomposing the precursors or synthesizing the active compounds from the latter. Also, in the method according to invention and although reducing conditions may possibly prevail, notably in the case when the electron conducting compound is carbon, they do not entail any degradation of the compounds even if the latter are sensitive to reduction.

The compounds applied in the method according to the invention are not synthesized in situ. These are compounds already synthesized beforehand, which are much less sensitive to a high temperature and/or to a reducing atmosphere than precursors exposed to such conditions.

The electrochemical performances, in particular at high (charging/discharging) rates and for high power of the cells and accumulators applying the mixture prepared with the method according the invention, are improved regardless of the electrode active compound and regardless of the associated range of operating potentials. This is illustrated and demonstrated in the examples given later on.

The invention further relates to the mixture of a powder of an electrode active compound and of a powder of an electron conducting compound which may be prepared by the method as described above.

This mixture notably finds its application as an electrode electrochemically active material in any electrochemical system.

The invention further relates to an electrode of an electrochemical system, such as a rechargeable electrochemical accumulator (secondary battery), with a non-aqueous electrolyte, comprising as an electrochemically active material, the mixture prepared by the method according to the invention.

This electrode may be a negative electrode or a positive electrode as well.

Generally such an electrode further comprises a binder, and/or a thickener and/or a surfactant and/or a salt, possibly electron conducting additive(s), and a current collector.

The invention also relates to a cell of a rechargeable accumulator, battery (secondary battery) with an organic non-aqueous electrolyte, notably of a lithium battery and more specifically of a Li-ion battery, comprising at least such an electrode, as well as the accumulator or battery comprising one or more of these cells.

The accumulator according to the invention may be a button cell.

The invention will now be described in a more specific way in the detailed description which follows, given as an illustration and not as a limitation, with reference to the appended drawings.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

The electrolyte consists of a lithium salt LiPF$_6$ [1 mol/L] dissolved in a mixture of ethylene carbonate, dimethyl carbonate and propylene carbonate in a mass proportion of 1/3/1.

Figure 5:
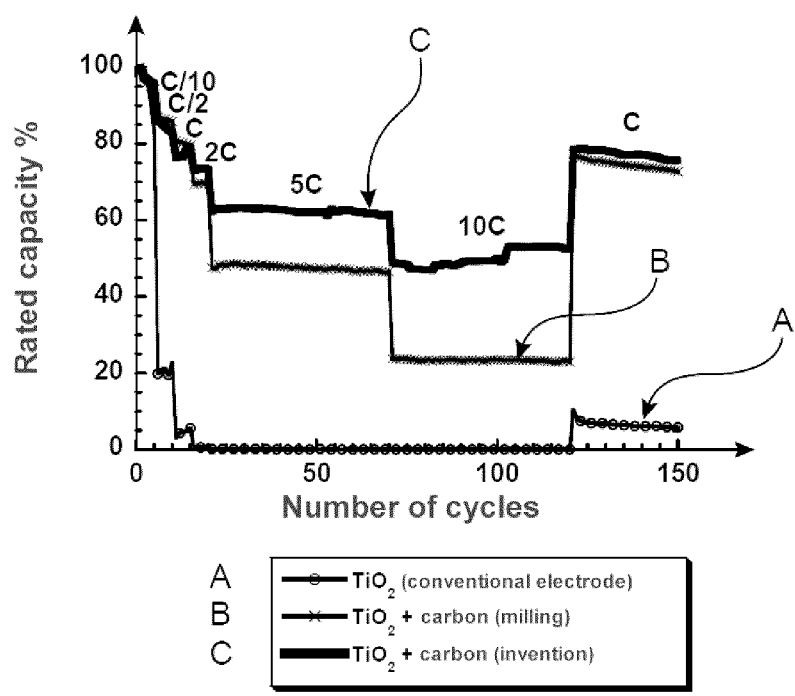

The potential (in volts vs. Li$^+$/Li), is plotted in ordinates and the specific capacity (in mAh/g) is plotted in abscissae;

FIG. 5 is a graph which shows the development of the capacity percentage between 1V and 3V vs. Li$^+$/Li (calculated on the basis of the initial capacity at C/10) versus the number of cycles and of the charging/discharging rates for button cells manufactured with a metal lithium negative electrode and a positive electrode respectively based on TiO$_2$-anatase (conventional electrode, curve A), based on TiO$_2$/carbon mixed by milling (curve B), or comprising the TiO$_2$/carbon mixture prepared by the method of the invention in Example 1 (curve C).

Figure 6:
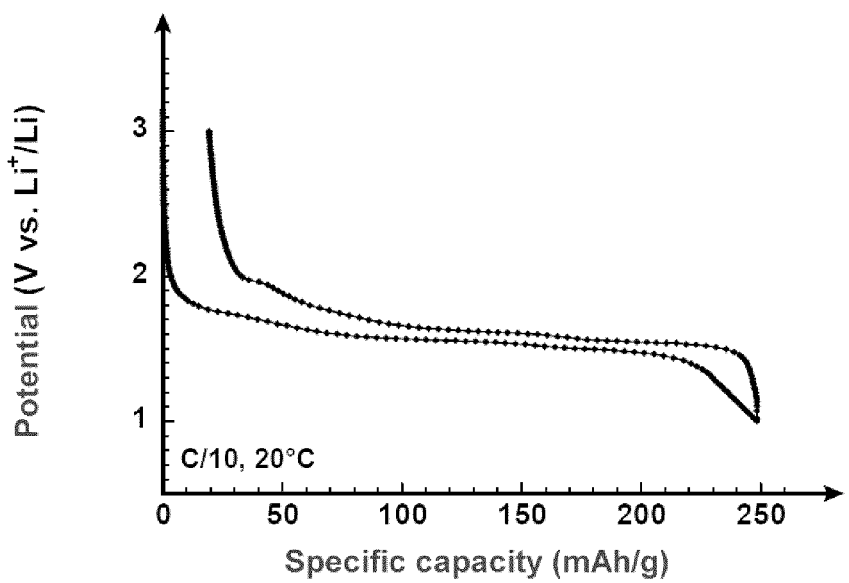

The rated capacity (in %) is plotted in ordinates and the number of cycles is plotted in abscissae;

FIG. 6 is a graph which shows the first charging/discharging cycle at a rate of C/10 between 1V and 3V vs. Li$^+$/Li at 20° C. of a button cell manufactured with a positive electrode comprising the TiO$_2$-anatase/carbon mixture prepared by the method of the invention in Example 2, and a metal lithium electrode.

The electrolyte consists of a lithium salt LiPF$_6$ [1 mol/L] dissolved in a mixture of ethylene carbonate, dimethyl carbonate and propylene carbonate in a mass proportion of 1/3/1.

Figure 7:
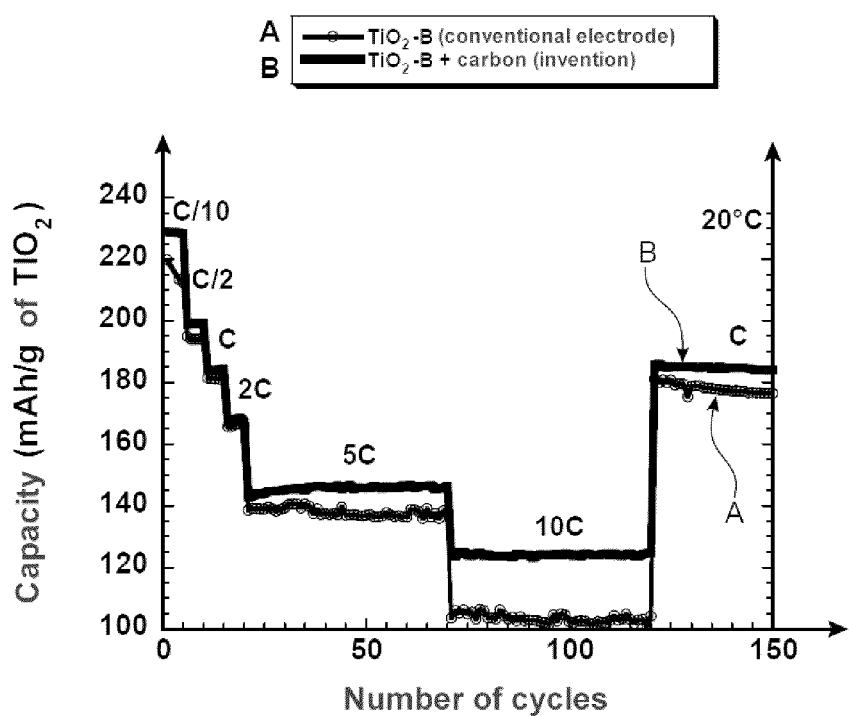
Figure 8:
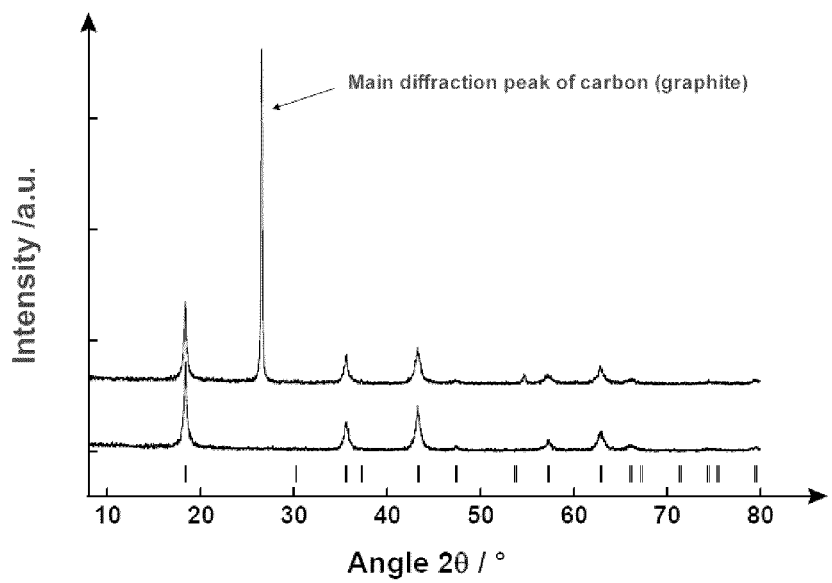
Figure 9:
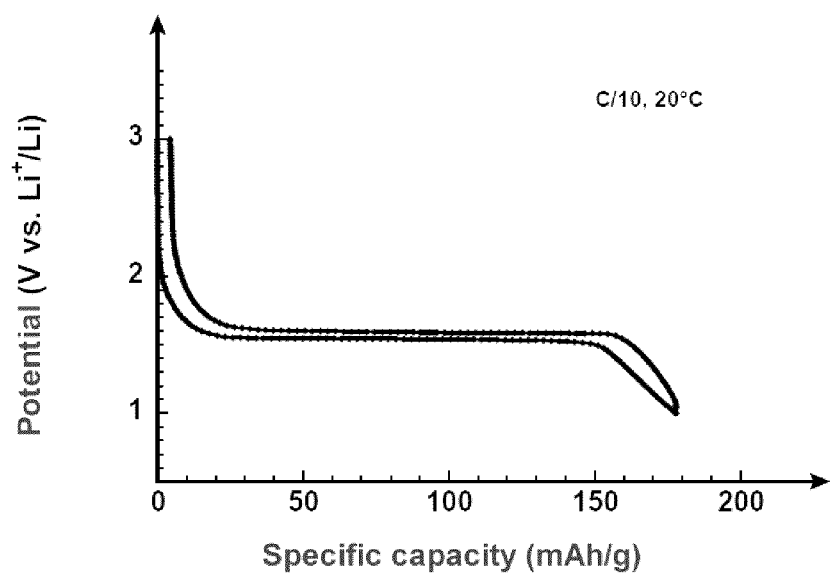

The potential (in volts vs. Li$^+$/Li), is plotted in ordinates and the specific capacity (in mAh/g) is plotted in abscissae;

FIG. 7 is a graph which shows the change in the rated capacity between 1V and 3V versus Li$^+$/Li at 20° C., depending on the number of cycles and on the charging/discharging rates for button cells manufactured with a negative metal lithium electrode and a positive electrode respectively based on TiO$_2$—B (conventional electrode, curve A), or comprising the TiO$_2$—B/carbon mixture prepared by the method of the invention in Example 2 (curve B). The capacity (in mAh/g of TiO$_2$) is plotted in ordinates and the number of cycles is plotted in abscissae;

FIG. 8 shows an X-ray diffraction diagram (copper anticathode; $\lambda_{CuK\alpha}$) of Li$_4$Ti$_5$O$_{12}$ powder synthesized in Example 3 (bottom) and of a Li$_4$Ti$_5$O$_{12}$/carbon mixture prepared by the method of the invention in Example 3 (top). The vertical symbols correspond to the Bragg positions calculated for a spatial group Fd-3m, with a lattice parameter of 8.36(1) Å. The intensity (in arbitrary units (a.u.)) is plotted in ordinates, and the angle 2 theta (in °) is plotted in abscissae;

FIG. 9 is a graph which shows the first changing/discharging cycle under C/10 rates between 1V and 3V vs. Li$^+$/Li at 20° C. of a button cell manufactured with a positive electrode comprising the Li$_4$Ti$_5$O$_{12}$/carbon mixture prepared by the method of the invention in Example 3, and a metal lithium electrode.

The electrolyte consists of a lithium salt LiPF$_6$ [1 mol/L] dissolved in a mixture of ethylene carbonate, dimethyl carbonate and propylene carbonate in a mass proportion of 1/3/1.

Figure 10:
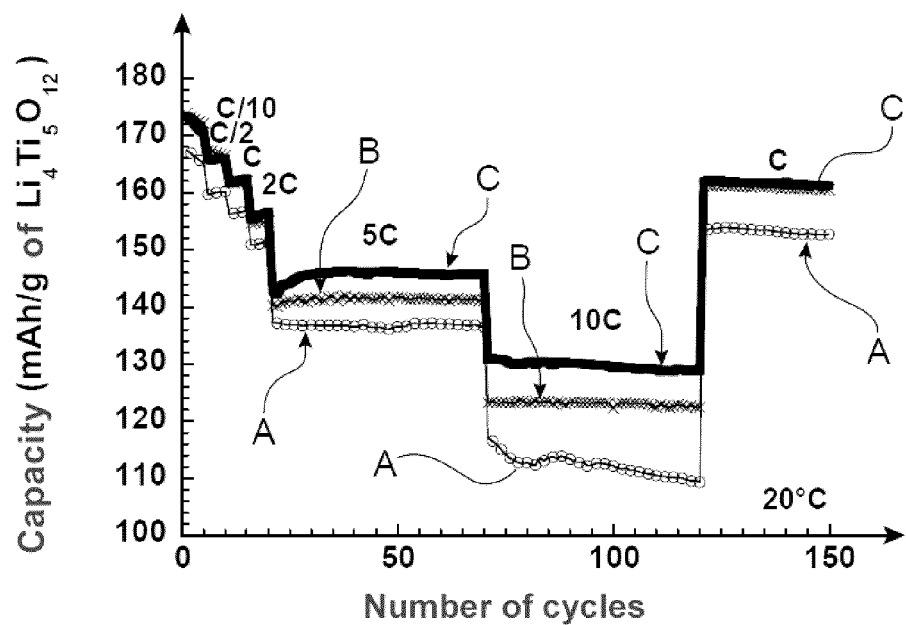
Figure 10:
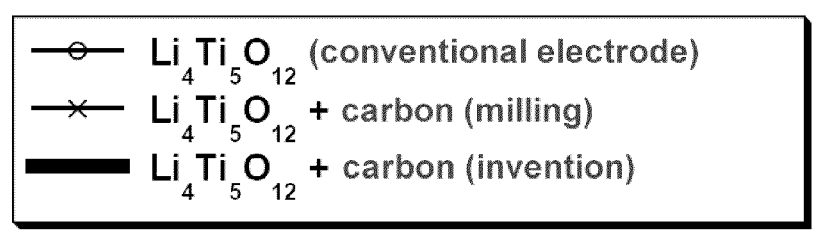

The potential (in volts vs. Li$^+$/Li) is plotted in ordinates, and the specific capacity (in mAh/g) in abscissae;

FIG. 10 is a graph which shows the time-dependent change in the rated capacity between 1V and 3V vs. Li$^+$/Li versus the number of cycles and the charging/discharging rates for button cells manufactured with a negative electrode of metal lithium and a positive electrode, respectively based on Li$_4$Ti$_5$O$_{12}$ (conventional electrode, curve A), based on Li$_4$Ti$_5$O$_{12}$/carbon mixed by milling (curve B), or comprising the Li$_4$Ti$_5$O$_{12}$/carbon mixture prepared by the method of the invention in Example 3 (curve C). The rated capacity (in mAh/g of Li$_4$Ti$_5$O$_{12}$) is plotted in ordinates, and the number of cycles is plotted in abscissae.

DETAILED DESCRIPTION OF CERTAIN EMBODIMENTS

This description generally refers more particularly to an embodiment in which the material prepared by the method according to the invention is the positive or negative electrode active material of a rechargeable lithium ion accumulator (lithium ion secondary battery), but it is quite obvious that the following description may easily be extended and adapted, if necessary, to any application and to any embodiment of the material prepared by the method according to the invention.

In the first step of the method according to the invention, a liquid medium is prepared, containing the powder of the electrode active compound and the powder of the electron conducting compound.

For example, the powder of the electrode active compound may be placed in a container, a tank, and the powder of the electron conducting compound may be added to this powder and finally the liquid medium may be added to both of these powders by introducing it into the container or tank.

But any other procedure leading to a liquid medium containing both powders is also possible. Thus, both powders may be added successively or simultaneously to a liquid medium found in a container or tank.

Generally, both powders and the liquid medium are simply put into contact without proceeding with any stirring which would for example aim at generating a dispersion of both powders into the liquid medium.

The electrode active compound may be any electrode active compound notably of an electrode of rechargeable accumulators (secondary batteries) with an organic electrolyte such as lithium accumulators, batteries and more particularly lithium ion accumulators, batteries.

The electrode active compound may thus be selected from positive electrode active compounds and negative electrode active compounds of Li-ion batteries in general.

The positive electrode generally forms a lithium source for the negative electrode. This electrode should therefore comprise as a compound, active material, a compound, a material which may initially release, i.e. during the first charging, lithium ions which will be again inserted during the discharge of the accumulator.

The electrode active compound applied in the method according to the invention may therefore be selected, in the case of a positive electrode, for example from lamellar oxides such as LiCoO$_2$, LiNi$_{0.8}$Co$_{0.15}$Al$_{0.05}$O$_2$, LiNi$_{1/3}$Co$_{1/3}$Mn$_{1/3}$O$_2$ and their derivatives; spinel oxides such as LiMn$_2$O$_4$, LiNi$_{0.5}$Mn$_{1.5}$O$_4$, LiNi$_{0.4}$Mn$_{1.6}$O$_4$ and their derivatives; and the compounds, materials with a polyanion backbone such as $LiFePO_4$, $LiMnPO_4$, $LiCoPO_4$, $Li_3V_2(PO_4)_3$, $Li_2CoSiO_4$, and derivatives thereof.

As the negative electrode is not generally a lithium source for the positive electrode, it should generally consist of a material which may initially accept lithium ions extracted from the positive electrode and give them back subsequently.

The electrode compound, applied in the method according to the invention, may therefore be selected for example, in the case of a negative electrode, from titanium oxides such as $Li_4Ti_5O_{12}$ or $TiO_2$ in the anatase or bronze form, from silicon, sulfur and carbon.

The electrode active compound appears as a powder, the particle size of which, generally defined by their diameter, may be from 20 mm to 100 μm.

In the method according to the invention it is possible to use a single electrode active compound or else several of these compounds.

The electron conducting compound may be selected from all the electron conducting compounds known to the man skilled in the art like metal particles such as Ag, Cu, Ni particles; carbon, for example in the form of graphite, carbon black, carbon fibers, carbon nanowires, carbon nanotubes, carbon nanospheres; electron conducting polymers; and mixtures thereof.

A preferred electron conducting compound is carbon.

The carbon may be in an amorphous or crystallized form. The carbon may have any type of morphology, for example it may appear as fibers, nanotubes, nanowires, nanospheres or other forms.

The carbon may in particular appear in the form of graphite, for example, synthetic graphite. A synthetic graphite powder is notably available from TIMCAL® under the name of Timrex® SFG6.

The electron conducting compound appears in the form of a powder, the particle size of which, generally defined by their diameter may be from 10 nm to 500 μm.

In the method according to the invention it is possible to use a single electron conducting compound or else several of these compounds.

Thus, a single type of carbon or else several types of carbon may be used stemming from various sources and which differ by their morphology and/or their particle size and/or their crystalline form.

According to the method of the invention, the electrode active compound, material, and the electron conducting compound are synthesized materials, prepared prior to applying the method of the invention and in a totally independent, separate way from the latter. Contrary to some of the methods of the prior art, the in situ synthesis of both compounds from precursors and generally at a high temperature is not carried out in the method of the invention.

The electrode active compound and the electron conducting compound may be prepared by methods known to the man skilled in the art or else these may be commercially available compounds.

Thus, in the following examples, $TiO_2$ is used in the commercial anatase form notably available from ALDRICH®, or else $TiO_2$ in the bronze form which is synthesized from potassium nitrate and $TiO_2$ in the anatase form prior to applying the method according to the invention, or else further $Li_4Ti_5O_{12}$ which is synthesized from $TiO_2$ and $Li_2CO_3$.

The initial mixture of electrode active compound powder and electron conducting compound powder generally comprises from 2 to 60%, for example 20% by mass of the electron conductor, such as carbon, and from 40 to 98%, for example 80% by mass of the electrode active compound, such as $TiO_2$.

The liquid medium may be selected from water, notably distilled water; aqueous solutions; organic solvents, for example ethanol, NMP (N-methylpyrrolidone), hexane, acetone; and mixtures thereof.

The concentration of electrode active compound in the liquid medium is generally from 10 to 100 g/L and the concentration of electron conducting compound in the liquid medium is generally from 0.2 to 60 g/L, preferentially from 3 to 50 g/L.

The liquid medium containing the powders is then subject to the action of ultrasonic waves of high, great energy.

Prior to the action of the ultrasonic waves and as this has been already specified, the medium generally does not require any other stirring, although the latter is not of a nature which would be detrimental to the described method.

These high energy ultrasonic waves are produced by placing the probe of a high intensity, high energy sonicator in the liquid medium.

According to the invention, therefore, no low energy ultrasound tank is applied but actually one or more probes producing high energy ultrasonic waves.

The temperature of the liquid medium is controlled, regulated, monitored so that it remains less than the boiling temperature of the liquid medium, and preferably stable.

In the case of a liquid medium composed of water, the temperature of the liquid medium is generally controlled so as not to exceed 60° C.

The temperature of the liquid medium may notably be monitored, controlled, regulated, by regulating, controlling, monitoring the density of ultrasonic energy applied to the liquid medium and by applying this energy intermittently, i.e. by observing pauses in time in applying this energy to the liquid medium.

The energy density may thus for example be from 150 to 700 W/L of liquid medium containing the powders.

The ultrasonic waves may be applied intermittently for durations generally from 1 to 10 seconds, separated by pauses in time generally from 1 to 10 seconds.

The total duration for applying ultrasonic waves or sonication duration is generally from 1 minute to 40 hours, preferably from 30 minutes to 30 hours, including the pauses.

The principle of the action of the ultrasonic waves on the liquid medium is based on the formation of vacuum microbubbles in the solution subsequent to the application of mechanical vibrations amplified by a probe.

The bursting of these vacuum microbubbles in the liquid medium according to a phenomenon called cavitation releases considerable energy allowing intense stirring of the solution and thus ensures that an intimate mixture of the particles of both compounds is obtained without notably causing any structural modification of the electrode active compound.

At the end of the treatment by ultrasonic waves, the liquid medium is totally removed from the mixture prepared by sonication. In the case when the liquid medium is water or an aqueous solution, it is therefore proceeded with dehydration of the mixture.

By total removal is meant that the liquid medium content in the final mixture is generally less than 0.5% or 5,000 ppm.

This removal of the liquid medium is generally carried out by means of a heat treatment or a succession of heat treatments and may be carried out by bringing the mixture to a temperature above the boiling temperature of the liquid medium.

For example, notably in the case when the liquid medium is water or an aqueous solution, it is first of all possible to carry out a partial dehydration step at atmospheric pressure for example at 55° c. until evaporation of the water, and then a complete dehydration step for the powder by heating it to a temperature generally from 100° c. to 400° c., for example 400° c., for 30 minutes to 10 hours, for example 1 hour to 3 hours.

Of course, the heat treatment temperature is controlled so as to remain below the decomposition threshold of the compounds forming the mixture according to the invention, so as not to alter its properties.

This last dehydration step is generally carried out under an inert, for example argon atmosphere, in order to avoid any oxidation of the compounds. Notably in the case of carbon, such an inert atmosphere during the final dehydration step gives the possibility of avoiding oxidation of the carbon and disappearance of a portion of the latter in the form of carbon dioxide.

Optionally, in order to carry out the partial dehydration, filtration may be contemplated, prior to the heat treatment.

After having removed the liquid medium from the powder mixture subject to the action of ultrasonic waves, in particular after the dehydration step described above, a powder mixture of electrode active material and of electron conducting compound powder is collected.

The mixture obtained by the method of the invention is homogeneous, and the electron conductor is properly dispersed and good distribution of the electron conductor in the lattice formed by the electrode active compound is observed.

The thereby prepared mixture according to the invention may be used as an electrochemically active material in any electrochemical system.

More specifically, the material prepared according to the invention may notably be used as a positive or negative electrode electrochemically active material in any electrochemical system with a non-aqueous electrolyte.

This positive or negative electrode comprises, in addition to the positive or negative electrode electrochemically active material prepared by the method according to the invention as defined above, a binder which is generally an organic polymer, optionally one or more electron conducting additive(s), optionally a thickener, optionally a surfactant or surface-active agent (tenside), optionally a salt, and a current collector.

The organic polymer may be selected from polytetrafluoroethylenes (PTFE), poly(vinylidene fluoride)s (PVDF), PVDF-HFP copolymers (HFP: propylene hexafluoride); polyethers; polyesters; poly(methyl methacrylate)s; polyacrylonitriles; and elastomers and natural or synthetic rubbers such as styrene-butadiene rubber and CMC-SBR (carboxymethylcellulose-styrene butadiene rubber).

The optional electron conducting additive of the electrode which is therefore an addition to the electron conducting compound of the mixture prepared by the method according to the invention, may be selected from metal particles such as Ag; Cu, Ni particles; from carbon, for example in the form of graphite, carbon black, carbon fibers, carbon nanowires, carbon nanotubes, carbon nanospheres; electron conducting polymers; and mixtures thereof.

The thickener may be selected from cellulose compounds such as carboxymethylcellulose and hydroxypropylcellulose.

The surfactant or surface-active agent (tenside) may be selected from dispersants and polyelectrolytes.

The current collector generally appears in the form of a copper, nickel or aluminium sheet.

The electrode according to the invention generally comprises from 70 to 94%, for example 80% by mass of electrochemically active material, from 1 to 20% by mass, preferably from 1 to 10% by mass of the binder, optionally from 0.5 to 5% by mass of the surfactant, optionally from 1 to 10% of the thickener, optionally from 1 to 5% of the salt, and optionally from 1 to 15% by mass of the or more electron conducting additive(s).

Such an electrode may be prepared in a standard way by forming a dispersion, suspension, paste (slurry) or ink with the electrochemically active material, the binder, optionally the thickener, optionally the surfactant, optionally the salt, and optionally the one or more conducting additive(s) and a solvent, by depositing, coating or printing this dispersion, suspension, slurry, or ink on a current collector, by drying the deposited ink, paste (slurry), dispersion or suspension, and by calendering, pressing the dried deposited ink, paste (slurry), suspension or dispersion and the current collector.

The suspension or dispersion may be an aqueous suspension or dispersion comprising a binder which is soluble in water or else a suspension or dispersion in an organic solvent.

The ink, paste (slurry), dispersion or suspension may be applied by any adequate method such as coating, layer (film coating), heliogravure, flexography, offset printing.

The electrochemical system in which the electrode according to the invention is applied, may notably be a rechargeable electrochemical accumulator (secondary battery) with a non-aqueous electrolyte such as a lithium accumulator or battery, and more particularly a Li-ion accumulator, battery.

At least one of the positive or negative electrodes of such an electrochemical system, comprises as an electrochemically active material, the material prepared by the method according to the invention.

The other negative or positive electrode may comprise the material according to the invention, or another active material.

It is therefore possible that both electrodes comprise a mixture according to the invention.

The optional negative or positive electrode which does not comprise as an electrochemically active material, the material, the mixture according to the invention, comprises an electrochemically active material different from the material according to the invention, a binder, optionally one or more electron conducting additive(s) and a current collector.

The binder and the optional electron additive(s) have already been described above.

The electrochemically active material of the optional negative or positive electrode which does not comprise the material according to the invention as an electrochemically active material, may be selected from all the materials known to the man skilled in the art.

When the material according to the invention is the electrochemically active material of the positive electrode, then the electrochemically active material of the negative electrode may for example be selected from lithium and from any material known to the man skilled in the art in this technical field, including the material prepared according to the invention.

When the electrochemically active material of the negative electrode is formed by the material according to the invention, the electrochemically active material of the positive electrode may be made with any known material which may be adapted by the man skilled in the art, or with a material prepared according to the invention.

The electrolyte may be solid or liquid.

When the electrolyte is liquid, it consists for example of a solution of at least one conducting salt such as a lithium salt in an organic solvent, and/or in an ionic liquid.

The lithium salt, dissolved in the solvent may be supported by a separator element positioned between both electrodes of the accumulator and impregnated with liquid electrolyte.

When the electrolyte is solid, it comprises a polymeric material and a lithium salt, i.e. a salt including at least the $Li^+$ cation.

The lithium salt may be for example selected from $LiAsF_6$, $LiClO_4$, $LiBF_4$, $LiPF_6$, LiBOB, LiODBF, LiB($C_6H_5$), $LiR_FSO_3$ for example $LiCF_3SO_3$, $LiCH_3SO_3$, $LiN(R_FSO_2)_2$ for example $LiN(CF_3SO_2)_2$ (LiTFSI) or $LiN(C_2F_5SO_2)_2$ (LiBETI), $LiC(R_FSO_2)_3$, for example $LiC(CF_3SO_2)_3$ (LiTFSM), wherein $R_F$ is selected from a fluorine atom and a perfluoroalkyl group comprising from 1 to 8 carbon atoms, LiTFSI is the acronym of lithium bis(trifluoromethylsulfonyl)imide, LiBOB is that of lithium bis(oxalato)borate, and LiBETI is that of lithium bis(perfluoroethylsulfonyl)imide.

The organic solvent is preferentially a solvent compatible with the constituents of the electrodes, relatively not very volatile, aprotic and relatively polar. For example, mention may be made of ethers, esters and mixtures thereof.

The ethers are notably selected from linear carbonates such as dimethyl carbonate (DMC), diethyl carbonate (DEC), ethyl-methyl carbonate (EMC), dipropyl carbonate (DPC), cyclic carbonates such as propylene carbonate (PC), ethylene carbonate (EC), and butylene carbonate; alkyl esters such as formates, acetates, propionates and butyrates; gamma butyrolactone, triglyme, tetraglyme, lactone, dimethylsulfoxide, dioxolane, sulfolane and mixtures thereof. The solvents are preferentially mixtures including EC/DMC, EC/DEC, EC/PC.

The polymeric material of the solid electrolyte may be selected from POE (polyethylene oxide), PAN (polyacrylonitrile), PMMA (polymethyl methacrylate), PVdF (polyvinylidene fluoride) or one of their derivatives.

The accumulator may notably have the shape of a button cell.

Figure 1:
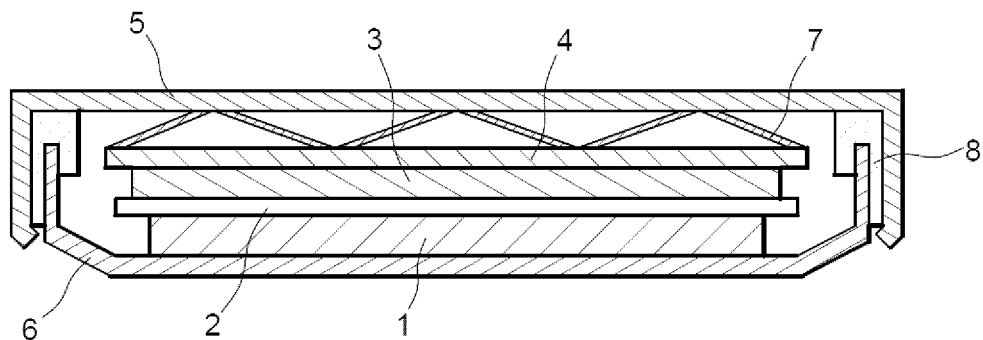
FIG. 1 is a schematic vertical sectional view of an accumulator in the form of a button cell comprising an electrode, the electrochemically active material of which is a mixture prepared by the method according to invention, such as the mixture prepared in Examples 1, 2 and 3 or else a comparative electrochemically active material such as that of the comparative examples.

The different components of a button cell, made of stainless steel 316L, are described in FIG. 1.

These elements are the following:
the upper (5) and lower (6) portions of the stainless steel casing,
the polypropylene gasket (8),
the stainless steel shims, skids (4), which are for example used both for cutting out the metal lithium and then later on for ensuring good contact of the current collectors with the external portions of the cell,
a spring (7), which ensures the contact between all the elements,
a microporous separator (2) impregnated with electrolyte, electrodes (1) (3).

The invention will now be described with reference to the following examples given as an illustration and not as a limitation.

EXAMPLE 1

In this example, a mixture of a powder of a negative electrode active compound, i.e. $TiO_2$ in the anatase form, and of a powder of an electron conducting compound, i.e. graphite is prepared by the method according to the invention.

A $TiO_2$ powder in the anatase form available from ALDRICH®, the particle diameter of which is less than 25 nanometers, is placed in a beaker.

The electron conductor used in this example is a synthetic graphite powder available from TIMCAL® under the name of TIMREX® SFG6.

The graphite is added to the $TiO_2$ in the beaker.

The mixture consists of 80% by mass of $TiO_2$ anatase and of 20% by mass of electron conductor.

The mixture is put into distilled water. The concentration is 70 g of $TiO_2$/L.

The preparation does not undergo any preliminary stirring.

The probe of a high intensity sonicator of the Sonics® type, VCX 500 W "ultrasonic processor" is placed in the beaker at the centre of the preparation.

The assembly is installed in a sound insulation box.

The maximum delivered power is comprised between 30 and 40 W and the temperature is controlled so as to not exceed 60° C.

A pause of 6 seconds is programmed every 3 seconds.

This step of the method according to the invention lasts for 20 hours.

The mixture prepared by sonication is then subject to a dehydration step at atmospheric pressure at 55° c. until evaporation of the water.

The powder is then completely dehydrated after heating to 400° c. for 3 hours. This step is performed under an inert atmosphere in order to avoid oxidation of carbon and a loss in the form of carbon dioxide.

Figure 2:
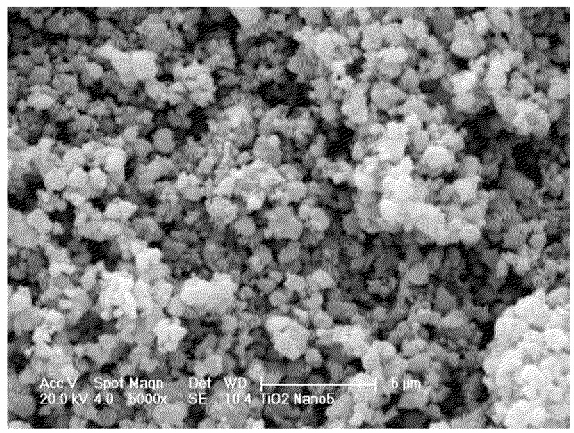
FIG. 2 is a micrograph obtained with a scanning electron microscope (SEM) of $TiO_2$ of the anatase form (a commercial product, available from ALDRICH®). The scale indicated in FIG. 2 represents 5 µm.
Figure 3:
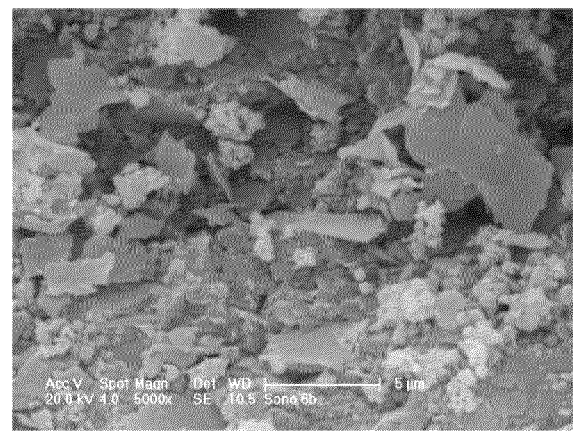
FIG. 3 is a micrograph obtained with a scanning electron microscope (SEB) of a sample of an anatase $TiO_2$ (AL- DRICH®)/carbon mixture obtained by the method of invention in Example 1. The scale indicated in FIG. 3 represents 5 μm.

The micrographs obtained by a scanning electron microscope (SEM) of commercial ALDRICH® $TiO_2$ of the anatase form (FIG. 2) and of the mixture obtained by the method according to the invention in the present example (FIG. 3) show that no change in the morphology of the particles of the precursor $TiO_2$ anatase is locatable after the treatment according to the method of the invention.

The carbon used in the present example appears as platelets (morphology of graphite).

The mixture obtained by the method of the invention is homogeneous; the electron conductor is properly dispersed.

The $TiO_2$/carbon mixture prepared in the present example in accordance with the invention is then tested as a positive electrode electrochemically active material in a metal lithium battery, accumulator (test as a half cell) of the « button cell» type.

This button cell is assembled while scrupulously observing the following procedure:

The following are thus stacked from the bottom of the casing of the cell, as this is shown in FIG. 1:
a negative lithium electrode (diameter of 16 mm, thickness of 130 μm) (1) deposited on a nickel disc used as a current collector, but any other negative electrode active material may be used, notably selected from standard active materials used in the art for a negative electrode in a non-aqueous medium;
200 μL of liquid electrolyte based on a $LiPF_6$ salt in an amount of 1 mol/L in solution in a mixture of ethylene carbonate, dimethyl carbonate and propylene carbonate in mass proportions of 1/3/1, but any other non-aqueous liquid electrolyte known in the art may be used, such as a mixture of dimethyl carbonate and of propylene carbonate in all proportions;

the electrolyte impregnates a separator, which is a microporous polyolefin membrane, more specifically a microporous membrane made of polypropylene Celgard® (2) Ø 16.5 mm;

a positive electrode (3) consisting of a disc with a diameter of 14 mm, taken on a film with a thickness of 25 μm comprising the mixture of $TiO_2$ and of carbon prepared as described above (80% by mass), of carbon black (10% by mass) by way of conducting material and polyvinylidene hexafluoride (10% by mass) by way of binder, the whole being deposited on a current collector made of aluminium (a sheet with a thickness of 20 μm);

a stainless steel disc or shim, skid (4), a stainless steel lid (5) and a stainless steel bottom (6), a stainless steel spring (7) and a polypropylene gasket (8).

The stainless steel casing is then closed by means of a crimper, making it perfectly airproof. In order to check whether the cell is operational, the latter is checked by measuring the floating voltage.

Because of the high reactivity of lithium and of its salts to oxygen and water, the assembling in the form of a button cell is accomplished in a glove box. The latter is maintained with a slight positive pressure under an atmosphere of anhydrous argon. Sensors allow continuous monitoring of the oxygen and water concentrations. Typically these concentrations should remain less than 1 ppm.

The mixture prepared by the method according to the invention of the present example and mounted in a button cell according to the procedure described above undergoes cycling operations, i.e. charging and discharging cycles under different conditions of constant current, for a determined number of cycles, in order to evaluate the practical capacity of the cell.

For example, a battery which is charged under C/20 rate is a battery to which a constant current is imposed for 20 hours with the purpose of recovering the whole of its capacity C. The value of the current is equal to the capacity C divided by the number of charging hours, i.e. in this case 20 hours.

A first test procedure is therefore conducted according to the following cycling operation with a total of 150 cycles (FIGS. 5):

5 charging-discharging cycles at C/10,
5 charging-discharging cycles at C/2,
5 charging-discharging cycles at C,
5 charging-discharging cycles at 2C,
50 charging-discharging cycles at 5C,
50 charging-discharging cycles at 10C,
30 charging-discharging cycles at C.

Figure 4:
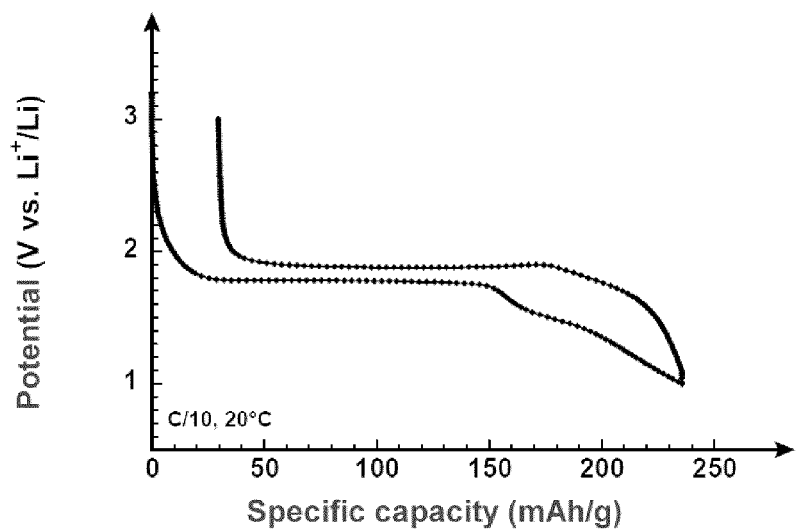
FIG. 4 is a graph which shows the first charging/discharging cycle at a rate of C/10 between 1V and 3V vs. Li$^+$/Li at 20° C. of a button cell manufactured with a positive electrode comprising the TiO$_2$-anatase/carbon mixture prepared by the method of invention in Example 1, and a metal lithium electrode.

At 20° c., under C/10 conditions, this system delivers a capacity of about 206 mAh/g of $TiO_2$ (FIG. 4).

EXAMPLE 1A

A positive electrode (which is a standard conventional electrode) comprising as an electrode electrochemically active material the commercial product $TiO_2$ anatase used in Example 1 is made under the same conditions as in Example 1 and this electrode is mounted with PVDF and optionally carbon black in a button cell in the same way as in Example 1.

The same test procedure as in Example 1 is then carried out following the same cycling operation.

EXAMPLE 1B

A mixture of commercial $TiO_2$ anatase used in Example 1 and of the same carbon as the one used in Example 1 is prepared in proportions of 80/20 in mass percent.

This mixture is made by milling with a mortar for 20 minutes.

A positive electrode is made, comprising as an electrochemically active material the mixture thus prepared by milling with a mortar.

In this comparative example, the electrode is elaborated conventionally by adding an organic solution with 80% of active material, 10% of carbon and 10% of polyvinylidene hexafluoride binder, before deposition on a current collector.

This electrode is then mounted in a button cell in the same way as in Example 1.

The same test procedure as in Example 1 is then carried out following the same cycling operation.

Under 10C conditions, rate, between 1V and 3V vs. $Li^+/Li$, the mixture prepared according to the method of the invention delivers a capacity of about 110 mAh/g i.e. 53% of the reversible capacity obtained in the first cycle under slow conditions, rate, (FIG. 5).

Within the swept range of potentials, only $TiO_2$-anatase is electrochemically active.

The mixture prepared by milling (Example 1B) delivers a capacity of about 55 mAh/g, i.e. 23% of the capacity obtained during the first charging/discharging cycle under slow conditions, rate, of the button cell (FIG. 5).

Finally, the capacity delivered by $TiO_2$ anatase alone (conventional electrode, Example 1A) not having therefore been subject to any step of the method of the invention, is zero (FIG. 5).

EXAMPLE 2

In this example, a mixture of a powder of a negative electrode active compound, i.e. $TiO_2$ of the bronze form and of a powder of an electron conducting compound, i.e. graphite, is prepared. The $TiO_2$—B is prepared from 6.64 grams of potassium nitrate ($KNO_3$; Merck®) and from 10 grams of titanium oxide in the anatase form ($TiO_2$-anatase;) Aldrich®. After milling, the mixture is heated to 900° c. for 15 hours. The prepared compound $K_2Ti_4O_9$ is then introduced into an acidified aqueous solution ($HNO_3$, 3 mol/L). Mechanical stirring is maintained for 3 hours at room temperature and then the solution is centrifuged. The recovered powder is again introduced into an acidified aqueous solution of the same concentration. The step is repeated three times. After the third centrifugation, the powder is washed several times with demineralized water.

Finally, the powder is heated to 400° C. for 3 hours in order to obtain titanium oxide $TiO_2$ with a structural form of the «bronze» type noted as $TiO_2$—B. The particles are of micrometric size. The specific surface area of the obtained product is 28 $m^2/g$.

An electron conductor, which is synthetic graphite available from TIMCAL® under the name of TIMREX® SFG6, is added to the thereby synthesized $TiO_2$—B sample. The active material $TiO_2$—B accounts for 80% by weight of the mixture.

Both materials are placed in distilled water (33 grams of $TiO_2$—B/L) and are mixed according to the method of the invention.

The high frequency ultrasonic mechanical energy (30 W) is provided by a high intensity sonicator (Sonics®, VCX 500 W "ultrasonic processor") placed in a sound insulation enclosure for 30 hours at room temperature.

The preparation is then brought to 55° c. for 24 hours.

The obtained $TiO_2$—B/carbon powder is then dehydrated at 400° c. for one hour under argon in order to retain the 80/20 mass proportions of the mixture.

The $TiO_2$—B/carbon mixture prepared in the present example in accordance with the method according to the invention was then tested as a positive electrode active material in a metal lithium battery, accumulator (test as a half cell) of the « button cell» type.

This button cell is mounted by observing the same procedure as in Example 1 except that the positive electrode (3) consists of a disc with a diameter of 14 mm, taken on a film with a thickness of 25 μm comprising the mixture of $TiO_2$ and of carbon prepared as described above (90% by mass), and polyvinylidene hexafluoride (10% by mass) by way of binder, the whole being deposited on a current collector made of aluminium (a sheet with a thickness of 20 μm).

The same test procedure as in Example 1 is carried out following the same cycling operation.

At 20° c., between 1V and 3V vs. $Li^+/Li$, under C/10 conditions, rate, this system delivers a reversible capacity of about 230 mAh/g of $TiO_2$—B (FIG. 6).

EXAMPLE 2A

A positive electrode (which is a standard conventional electrode) comprising as an electrochemically active material the $TiO_2$ bronze product synthesized in Example 2 is made under the same conditions, rate, as in Example 2 and this electrode is mounted in a button cell in the same way as in Example 2.

The same test procedure as in Example 2 is then carried out following the same cycling operation.

Under 10C conditions, rate, the $TiO_2$—B not having been subject to any step of the method of the invention (Example 2A) delivers a capacity of 103 mAh/g (FIG. 7). The mixture prepared according to method of the invention (Example 2), as for it, delivers a capacity of about 125 mAh/g (FIG. 7).

Between 1V and 3V vs. $Li^+/Li$, the carbon, the electron conductor present in the prepared mixture according to the invention is electrochemically inactive.

EXAMPLE 3

In this example, a mixture of a powder of a negative electrode active compound, i.e. $Li_4Ti_5O_{12}$, and of a powder of an electron conducting compound, i.e. graphite, is prepared.

The titanium oxide $Li_4Ti_5O_{12}$ is prepared by mixing 201.05 grams of $TiO_2$ available from Huntsman® with 76.11 grams of $Li_2CO_3$ available from Aldrich® in a planetary milling machine in the presence of heptane for 2 hours.

After drying the mixture, the milled product is heated to 500° c. for 15 hours, and then to 680° c. for 15 hours, and finally to 900° c. for 5 hours. The product is then homogenized in a planetary milling machine for 1 hour, and then again heated to 900° c. for 5 hours. Final 24-hour milling is then carried out before bringing the powder directly to 500° c. for 15 minutes under an argon atmosphere (quartz tube, sealed under argon), and rapidly cooling it to room temperature. The X-ray diffraction diagram, pattern shows a pure and well-crystallized compound $Li_4Ti_5O_{12}$ (FIG. 8).

A thereby prepared sample of $Li_4Ti_5O_{12}$ is placed in a beaker containing an electron conductor which is synthetic graphite available from TIMCAL® under the name of TIMREX® SFG6. The amount of carbon corresponds to 20% by mass of the $Li_4Ti_5O_{12}$/carbon mixture. A volume of distilled water is added into the beaker in order to obtain a concentration of 20 g/L of $Li_4Ti_5O_{12}$. After installing the probe of a sonicator (Sonics®, VCX 500 W "ultrasonic processor") inside the preparation, ultrasonic mechanical energy is intermittently delivered at a power of 35 W with a pause every 6 seconds between intervals of 3 seconds during which the ultrasonic waves are applied, for 24 hours at room temperature. The active material/carbon mixture is dried at 55° C. for 24 hours, and then at 400° C. for three hours under argon in order to remove the water and obtain an electrode material for an accumulator. The preparation method of the invention does not modify the structure of the electrochemically active compound (FIG. 8).

In this example, the carbon used is crystallized.

The $Li_4Ti_5O_{12}$/carbon mixture prepared in the present example in accordance with the method according to the invention was then tested as a positive electrode active material in a metal lithium battery, accumulator (test as a half-cell) of the « button cell» type.

This button cell is mounted while observing the same procedure as in Example 1 except that the positive electrode (3) consists of a disc with a diameter of 14 mm taken on a 25 μm thick film comprising the mixture of $Li_4Ti_5O_{12}$ and of carbon prepared as described above (80% by mass), polyvinylidene hexafluoride (10% by mass) by way of binder, and carbon black (10% by mass), the whole being deposited on a current collector made of aluminium (a 20 μm thick sheet).

The same test procedure as in Example 1 is then carried out following the same cycling operation.

At 20° c., under C/10 conditions, rate, this system delivers a capacity of about 174 mAh/g of $Li_4Ti_5O_{12}$ (FIG. 9).

EXAMPLE 3A

The product $Li_4Ti_5O_{12}$ synthesized in Example 3 which has not been subject to the preparation method of the invention is tested in a button cell under the same conditions for electrode preparation, for making the button cell and for cycling as those of Example 3.

The positive electrode is therefore in this case a standard conventional electrode.

EXAMPLE 3B

A mixture of 80% by mass of $Li_4Ti_5O_{12}$ used in Example 3 with 20% by mass of the same carbon used in Example 3 is manually prepared in an agate mortar.

This mixture is also tested in a button cell under the same conditions for preparing an electrode, for making the cell and for cycling as those of Examples 3 and 3A.

Under 10C conditions, rate, between 1V and 3V vs. $Li^+/Li$, the mixture prepared according to the method of the invention delivers a capacity of about 130 mAh/g (FIG. 10). The mixture prepared by manual milling delivers a capacity of about 122 mAh/g (FIG. 10). Finally, the capacity delivered by $Li_4Ti_5O_{12}$ not having been subject to any step of the method of the invention is about 112 mAh/g (FIG. 10).

What is claimed is:

1. A method for preparing a mixture of a powder of an electrode active compound and of a powder of an electron conducting compound, the method comprising:
preparing a liquid medium containing the powder of the electrode active compound and the powder of the electron conducting compound;
subjecting the liquid medium containing the powder of the electrode active compound and the powder of the electron conducting compound to the action of high energy ultrasonic waves by placing a probe of a high intensity, high energy sonicator in the liquid medium;
removing the liquid medium; and collecting a powder consisting of a mixture of the powder of the electrode active compound and of the powder of the electron conducting compound.

2. The method according to claim 1, wherein the action of the ultrasonic waves is controlled so that it allows a temperature of the liquid medium to be maintained below the boiling temperature of said liquid medium.

3. The method according to claim 1 wherein the energy density produced by the ultrasonic waves is from about 50 to about 1000 W/L.

4. The method according to claim 1, wherein the liquid medium is subjected to the action of ultrasonic waves intermittently.

5. The method according to claim 1, wherein the liquid medium is subjected to the action of ultrasonic waves for periods from about 1 to about 10 seconds while observing pauses with a duration from about 1 to about 10 seconds between two periods.

6. The method according to claim 1, wherein the liquid medium is subjected to the action of ultrasonic waves for a total duration from about 1 minute to about 40 hours.

7. The method according to claim 1, wherein the liquid medium is selected from water, aqueous solutions, organic solvents, and mixtures thereof.

8. The method according to claim 1, wherein the powder consisting of a mixture of the powder of the electrode active compound and of the powder of the electron conducting compound is insoluble in the liquid medium.

9. The method according to claim 1, wherein the electrode active compound is selected from positive electrode active compounds of Li-ion batteries, negative electrode active compounds of Li-ion batteries, and positive electrode active compounds of metal lithium batteries.

10. The method according to claim 1, wherein the electrode active compound is selected from titanium oxides, compounds with a polyanion backbone, lamellar oxides, spinel oxides, silicon, sulfur, carbon, graphite carbon, and mixtures thereof.

11. The method according to claim 1, wherein the electron conducting compound is selected from metal particles, carbon, electron conducting polymers, and mixtures thereof.

12. The method according to claim 11, wherein the electron conducting compound is a carbon or a mixture of carbons selected from amorphous or crystallized carbons, in the form of fibers, nanotubes, nanowires or nanospheres.

13. The method according to claim 1, wherein the electron conducting compound accounts for about 2 to about 60 % by mass of the mixture.

14. A mixture of a powder of an electrode active compound and of a powder of an electron conducting compound which is prepared by the method according to claim 1.

15. An electrode comprising an electrode electrochemically active material comprising the mixture according to claim 14.

16. The electrode according to claim 15, further comprising:

at least one of a binder, a thickener, a surfactant, and a salt; and a current collector.

17. A cell of a rechargeable accumulator comprising a nonaqueous organic electrolyte comprising at least one electrode according to claim 15.

18. An accumulator or battery comprising one or more cells according to claim 17.

19. The accumulator or battery according to claim 18, wherein the battery is a lithium battery and/or a Li-ion battery.

20. The accumulator according to claim 18, wherein the accumulator comprises a button cell.

21. The method according to claim 2, wherein the action of the ultrasonic waves is controlled so that it allows a temperature of the liquid medium to be maintained at a stable temperature.

22. The method according to claim 1, wherein the energy density produced by the ultrasonic waves is from about 150 to about 700 W/L.

23. The method according to claim 1, wherein the energy density produced by the ultrasonic waves is from about from about 300 to about 500 W/L of the liquid medium.

24. The method according to claim 1, wherein the liquid medium is subjected to the action of ultrasonic waves for a total duration from about from about 30 minutes to about 30 hours.

25. The method according to claim 7, wherein the organic solvents include ethanol, NMP (N-methyl-pyrrolidone), hexane, acetone, and mixtures thereof.

26. The method according to claim 10, wherein the titanium oxides comprises one of $TiO_2$ in bronze form, $TiO_2$ in anatase form, $Li_4Ti_5O_{12}$, wherein compounds with a polyanion backbone comprise one of $LiFePO_4$, $LiMnPO_4$, and $Li_3V_2 (PO_4)_3$, wherein the lamellar oxides comprise one of $LiCoO_2$ and $LiNi_{0.8}Co_{0.15}Al_{0.05}O_2$, and wherein the spinel oxides comprise one of $LiMn_2O_4$, and $LiNi_{0.5}Mn_{1.5}O_4$.

27. The electrode according to claim 16, wherein the electrode further comprises one or more conducting additive(s).

28. The method according to claim 1, wherein the liquid medium is binder-free.

* * * * *